(12) United States Patent
Kobayashi

(10) Patent No.: US 10,565,703 B2
(45) Date of Patent: Feb. 18, 2020

(54) IMAGE INSPECTION DEVICE, IMAGE INSPECTION METHOD, AND IMAGE INSPECTION PROGRAM

(71) Applicant: NEC Corporation, Tokyo (JP)

(72) Inventor: Hiroyuki Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 8 days.

(21) Appl. No.: 15/715,823

(22) Filed: Sep. 26, 2017

(65) Prior Publication Data

US 2018/0089818 A1 Mar. 29, 2018

(30) Foreign Application Priority Data

Sep. 27, 2016 (JP) .................................. 2016-188594

(51) Int. Cl.
*G06T 7/00* (2017.01)

(52) U.S. Cl.
CPC .... *G06T 7/001* (2013.01); *G06T 2207/20081* (2013.01); *G06T 2207/20084* (2013.01); *G06T 2207/30108* (2013.01)

(58) Field of Classification Search
CPC ........... G06T 7/001; G06T 2207/30148; G06T 2207/30168; G06T 7/0002; G06T 7/0004; G06T 2207/30108; G06T 2207/30141; G06T 7/337; G06T 1/0007; G06T 2207/20081; G06T 2207/20084; H01J 2237/2817; H01J 2237/24592; H01J 2237/2594; H01J 37/28; G06K 9/4604; G06K 9/52; G06K 2209/19; G06K 9/46; G06K 9/6255; G06K 2209/03;

(Continued)

(56) References Cited

U.S. PATENT DOCUMENTS 6,614,923 B1 * 9/2003 Shishido ................. G06T 5/006
382/144
6,687,396 B1 * 2/2004 Sugiura .............. G01M 11/0257
356/127

(Continued)

FOREIGN PATENT DOCUMENTS

| JP | 4670722 | 4/2011 |
|---|---|---|
| JP | 4978227 | 7/2012 |
| JP | 5748472 | 7/2015 |

*Primary Examiner* — Aklilu K Woldemariam
(74) *Attorney, Agent, or Firm* — Young & Thompson

(57) ABSTRACT

The image inspection device includes: a first extraction unit configured to repeatedly execute processing for moving a predetermined region by a predetermined distance on an inspection target image to extract an image of the predetermined region after movement as a first determination image until a predetermined first ratio of the inspection target image is included in a plurality of first determination images, and a second extraction unit configured to repeatedly execute processing for moving a predetermined region by a distance smaller than the predetermined distance on an image in the inspection target image including a first determination image where a determined degree satisfies a predetermined condition to extract an image of the predetermined region after movement as a second determination image until a predetermined second ratio of the image in the inspection target image including a first determination image is included in a plurality of second determination images.

11 Claims, 14 Drawing Sheets

(58) Field of Classification Search
CPC ...... H04N 1/6047; H04N 7/183; H04N 5/772; G01N 23/18; G01N 21/956; G01N 21/95684; G01N 21/8851; G01M 11/0257; G01M 11/0278; G02B 5/223; G06F 17/18
USPC ....... 382/141, 154, 149, 147, 201, 294, 290, 382/305, 145, 181
See application file for complete search history.

(56) References Cited

U.S. PATENT DOCUMENTS

| | | | | |
|---|---|---|---|---|
| 7,983,482 B2* | 7/2011 | Kamata | ............... | G06K 9/4647 382/168 |
| 8,849,063 B2* | 9/2014 | Takahashi | .......... | H04N 5/23293 348/E5.058 |
| 2004/0096085 A1* | 5/2004 | Matsumoto | ........ | A63B 24/0003 382/107 |
| 2006/0067570 A1* | 3/2006 | Onishi | ................... | G06T 7/001 382/147 |
| 2006/0291713 A1* | 12/2006 | Moriya | .............. | G01N 21/8851 382/147 |
| 2006/0291719 A1* | 12/2006 | Ikeda | ................. | G01B 11/0608 382/154 |
| 2007/0230763 A1* | 10/2007 | Matsumoto | ........... | G06T 7/0012 382/131 |
| 2009/0136121 A1* | 5/2009 | Nakagaki | .............. | G06T 7/0006 382/149 |
| 2010/0067780 A1* | 3/2010 | Kawaragi | ............. | B81C 99/005 382/149 |
| 2010/0074516 A1* | 3/2010 | Kawaragi | ............ | G01N 21/956 382/149 |
| 2010/0119156 A1* | 5/2010 | Noguchi | ............... | H04N 19/132 382/190 |
| 2010/0246931 A1* | 9/2010 | Kim | ..................... | G01N 21/956 382/141 |
| 2011/0163230 A1* | 7/2011 | Hiroi | ....................... | H01J 37/20 250/310 |
| 2014/0232849 A1* | 8/2014 | Ogawa | .................. | G06T 7/0004 348/87 |
| 2015/0022638 A1* | 1/2015 | Saeki | .................... | G06T 7/0004 348/46 |
| 2015/0228063 A1* | 8/2015 | Minakawa | ........... | H01J 37/244 382/151 |
| 2015/0294083 A1* | 10/2015 | Yokokubo | .............. | G16H 50/70 705/2 |
| 2015/0355101 A1* | 12/2015 | Sun | ....................... | H04N 13/254 348/46 |
| 2016/0171691 A1* | 6/2016 | Nakamura | ............. | A61B 6/505 382/132 |
| 2016/0267648 A1* | 9/2016 | Yamashita | .............. | G06T 5/009 |
| 2017/0323437 A1* | 11/2017 | Takimoto | ................ | G06K 9/42 |
| 2018/0005363 A1* | 1/2018 | Nagatomo | ............. | G01B 15/00 |

* cited by examiner

FIG. 5

| FILE NAME | CORRECT ANSWER |
|---|---|
| A1.png | NORMAL |
| A2.png | NORMAL |
| A3.png | TOP RIGHT |
| A4.png | RIGHT |
| A5.png | CENTER |
| A6.png | NORMAL |
| A7.png | BOTTOM |
| A8.png | BOTTOM LEFT |
| A9.png | RIGHT |
| A10.png | NORMAL |
| ... | |

FIG. 6

| FILE NAME | CORRECT ANSWER |
|---|---|
| B1.png | NORMAL |
| B2.png | NORMAL |
| B3.png | NORMAL |
| B4.png | NORMAL |
| B5.png | DEFECTIVE |
| B6.png | NORMAL |
| B7.png | DEFECTIVE |
| B8.png | DEFECTIVE |
| B9.png | NORMAL |
| B10.png | DEFECTIVE |
| ... | |

FIG. 11

| ORIGINAL FILE NAME | SIMPLE INSPECTION IMAGE FILE NAME | x COORDINATE | y COORDINATE | SCORE NORMAL | SCORE TOP RIGHT | SCORE TOP | ... |
|---|---|---|---|---|---|---|---|
| 1.png | 1_000_000.png | 0 | 0 | 0.1 | 0.2 | 0.5 | |
| 1.png | 1_000_100.png | 0 | 100 | 0.0 | 0.9 | 0.0 | |
| 1.png | 1_000_200.png | 0 | 200 | 0.8 | 0.0 | 0.1 | |
| 1.png | 1_100_000.png | 100 | 0 | 0.6 | 0.1 | 0.2 | |
| 1.png | 1_100_100.png | 100 | 100 | 0.1 | 0.1 | 0.1 | |
| 1.png | 1_100_200.png | 100 | 200 | 0.2 | 0.1 | 0.3 | |
| 1.png | 1_200_000.png | 200 | 0 | 0.1 | 0.0 | 0.0 | |
| 1.png | 1_200_100.png | 200 | 100 | 0.5 | 0.5 | 0.1 | |
| 1.png | 1_200_200.png | 200 | 200 | 0.1 | 0.8 | 0.0 | |
| 2.png | 2_000_000.png | 0 | 0 | 0.1 | 0.0 | 0.0 | |
| 2.png | 2_000_100.png | 0 | 100 | 0.1 | | 0.6 | |
| ... | | | | | | | |

FIG. 12

| ORIGINAL FILE NAME | DETAILED INSPECTION IMAGE FILE NAME | x COORDINATE | y COORDINATE | SCORE |
|---|---|---|---|---|
| 1.png | 1_000_000.png | 0 | 0 | 0.01 |
| 1.png | 1_000_010.png | 0 | 10 | 0 |
| 1.png | 1_000_020.png | 0 | 20 | 0 |
| 1.png | 1_010_000.png | 10 | 0 | 0.3 |
| 1.png | 1_010_010.png | 10 | 10 | 0.1 |
| 1.png | 1_010_020.png | 10 | 20 | 0.02 |
| 1.png | 1_020_000.png | 20 | 0 | 0.1 |
| 1.png | 1_020_010.png | 20 | 10 | 0.25 |
| 1.png | 1_020_020.png | 20 | 20 | 0.1 |
| 2.png | 2_000_000.png | 0 | 0 | 0.1 |
| 2.png | 2_000_010.png | 0 | 10 | 0.1 |
| ... | | | | |

IMAGE INSPECTION DEVICE, IMAGE INSPECTION METHOD, AND IMAGE INSPECTION PROGRAM

This application is based upon and claims the benefit of priority from Japanese patent application No. 2016-188594, filed on Sep. 27, 2016, the disclosure of which is incorporated here in its entirety by reference.

TECHNICAL FIELD

The present invention relates to an image inspection device, an image inspection method, and an image inspection program.

BACKGROUND ART

Due to the improvement in the computation speed of the computer and the increase in the storage capacity of the storage medium such as a hard disk, even large-scale data is often analyzed easily. Along with the ease of analysis of large-scale data, image recognition technology using machine learning has been utilized in various fields. Attempts have also been made to apply image recognition technology using machine learning to defective product inspection of products.

Patent Literatures (PTLs) 1 to 2 describe an example of image recognition technology using machine learning. PTL 1 describes an object identification device for sectioning an image finely to perform identification by machine learning in each sectioned images when performing object identification.

In addition, PTL 2 describes an image detection device for detecting a specific state by using a neural network when detecting a specific state by using an image.

CITATION LIST

Patent Literature

PTL 1: Japanese Patent No. 5748472
PTL 2: Japanese Patent No. 4978227
PTL 3: Japanese Patent No. 4670722

SUMMARY

An exemplary object of the invention is to provide an image inspection device, an image inspection method, and an image inspection program capable of performing inspection processing at high speed by using learning type image recognition technology.

The image inspection device according to the present invention includes: a first extraction unit configured to repeatedly execute processing for moving a predetermined region by a predetermined distance on an inspection target image to extract an image of the predetermined region after movement as a first determination image until a predetermined first ratio of the inspection target image is included in a plurality of first determination images, a determination unit configured to determine a degree of possibility that an inspection object is displayed in an extracted first determination image, and a second extraction unit configured to repeatedly execute processing for moving a predetermined region by a distance smaller than the predetermined distance on an image in the inspection target image including a first determination image where a determined degree satisfies a predetermined condition to extract an image of the predetermined region after movement as a second determination image until a predetermined second ratio of the image in the inspection target image including a first determination image is included in a plurality of second determination images; and the determination unit determines a degree of possibility that the inspection object is displayed in an extracted second determination image.

The image inspection method according to the present invention includes: repeatedly executing processing for moving a predetermined region by a predetermined distance on an inspection target image to extract an image of the predetermined region after movement as a first determination image until a predetermined first ratio of the inspection target image is included in a plurality of first determination images; determining a degree of possibility that an inspection object is displayed in an extracted first determination image; repeatedly executing processing for moving a predetermined region by a distance smaller than the predetermined distance on an image in the inspection target image including a first determination image where a determined degree satisfies a predetermined condition to extract an image of the predetermined region after movement as a second determination image until a predetermined second ratio of the image in the inspection target image including a first determination image is included in a plurality of second determination images; and determining a degree of possibility that the inspection object is displayed in an extracted second determination image.

The non-transitory computer-readable recording medium recording an image inspection program according to the present invention stores the image inspection program for causing a computer to execute: repeatedly executing processing for moving a predetermined region by a predetermined distance on an inspection target image to extract an image of the predetermined region after movement as a first determination image until a predetermined first ratio of the inspection target image is included in a plurality of first determination images; determining a degree of possibility that an inspection object is displayed in an extracted first determination image; repeatedly executing processing for moving a predetermined region by a distance smaller than the predetermined distance on an image in the inspection target image including a first determination image where a determined degree satisfies a predetermined condition to extract an image of the predetermined region after movement as a second determination image until a predetermined second ratio of the image in the inspection target image including a first determination image is included in a plurality of second determination images; and determining a degree of possibility that the inspection object is displayed in an extracted second determination image.

BRIEF DESCRIPTION OF THE DRAWINGS

FIG. 5 is an explanatory diagram showing an example of correct answer labels of simple inspection learning images.

FIG. 6 is an explanatory diagram showing an example of correct answer labels of detailed inspection learning images.

FIG. 11 is an explanatory diagram showing an example of the simple inspection result.

FIG. 12 is an explanatory diagram showing an example of the detailed inspection result.

DESCRIPTION OF EXEMPLARY EMBODIMENT

First Exemplary Embodiment

Figure 1:
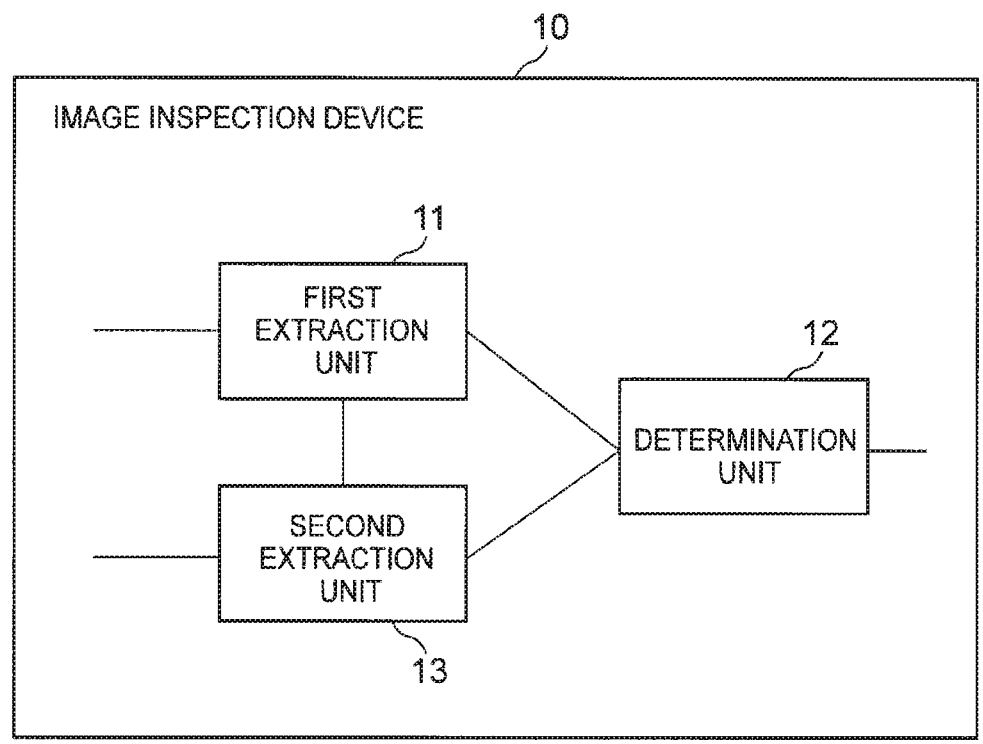
FIG. 1 is a block diagram showing a configuration example of a first exemplary embodiment of an image inspection device according to the present invention.

In the following, an exemplary embodiment of the present invention will be described with reference to the accompanying drawings. FIG. 1 is a block diagram showing a configuration example of a first exemplary embodiment of an image inspection device according to the present invention. The image inspection device 10 according to the present invention includes: a first extraction unit 11 (for example, simple inspection image extraction unit 108) configured to repeatedly execute processing for moving a predetermined region by a predetermined distance on an inspection target image to extract an image of the predetermined region after movement as a first determination image until a predetermined first ratio of the inspection target image is included in a plurality of first determination images, a determination unit 12 (for example, prediction unit 110) configured to determine a degree of possibility that an inspection object is displayed in an extracted first determination image, and a second extraction unit 13 (for example, detailed inspection image extraction unit 109) configured to repeatedly execute processing for moving a predetermined region by a distance smaller than the predetermined distance on an image in the inspection target image including a first determination image where a determined degree satisfies a predetermined condition to extract an image of the predetermined region after movement as a second determination image until a predetermined second ratio of the image in the inspection target image including a first determination image is included in a plurality of second determination images; and the determination unit 12 determines a degree of possibility that the inspection object is displayed in an extracted second determination image.

Figure 2:
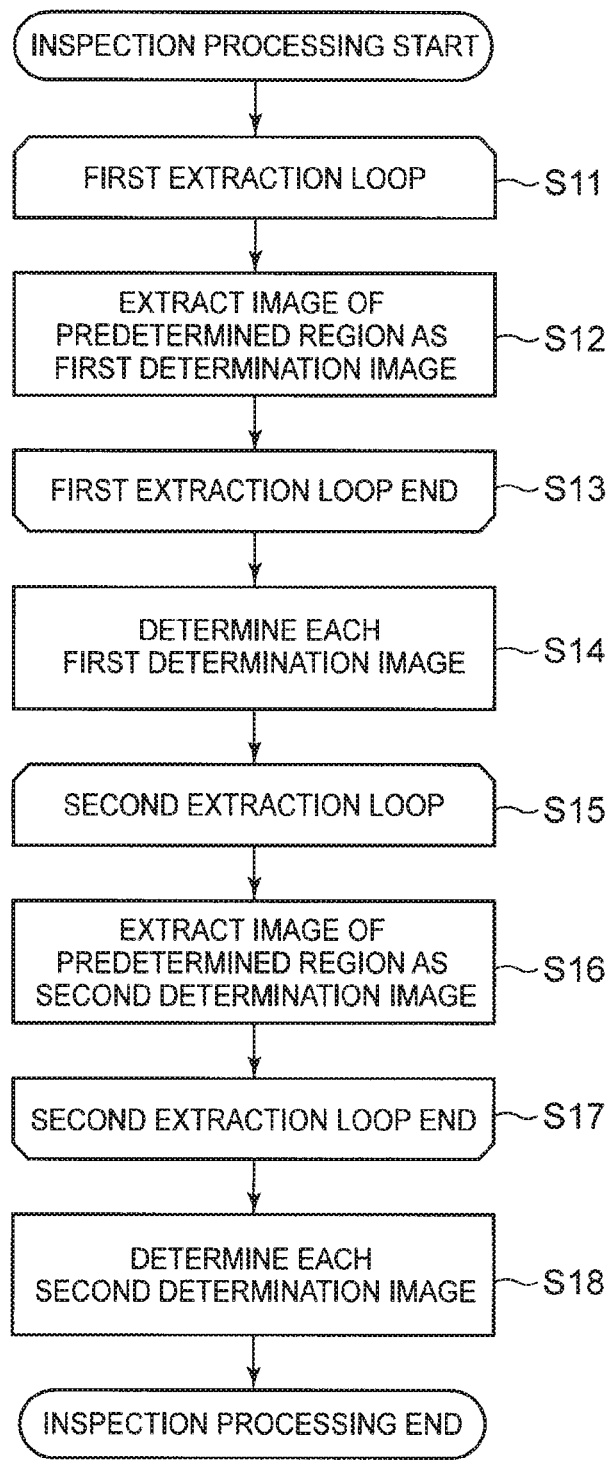
FIG. 2 is a flowchart showing the operation of inspection processing by the image inspection device 10 of the first exemplary embodiment.

In the following, the inspection processing by the image inspection device 10 will be described. FIG. 2 is a flowchart showing the operation of inspection processing by the image inspection device 10 of the first exemplary embodiment.

The inspection target image is input into the first extraction unit 11. That is, the process enters the first extraction loop (step S11).

The first extraction unit 11 moves a predetermined region on the input inspection target image by a predetermined distance, and extracts an image of the predetermined region after the movement as a first determination image (step S12). The first extraction unit 11 repeatedly executes the processing in step S12 while the inspection target image included in the extracted plurality of first determination images is less than a predetermined first ratio.

When the predetermined first ratio of the inspection target image is included in a plurality of first determination images, the first extraction unit 11 exits the first extraction loop (step S13).

Next, the determination unit 12 determines the degree of possibility that the inspection object is displayed for each of the extracted plurality of first determination images (step S14).

Then, the inspection target image input into the first extraction unit 11, and the information on the first determination image where the determined degree satisfies a predetermined condition are input into the second extraction unit 13. That is, the process enters the second extraction loop (step S15).

The second extraction unit 13 moves a predetermined region on an image in the inspection target image including the first determination image indicated by the input information by a distance smaller than the predetermined distance, and extracts an image of the predetermined region after the movement as a second determination image (step S16). The second extraction unit 13 repeatedly executes the processing in step S16 while the image in the inspection target image including the first determination image included in the extracted plurality of second determination images is less than a predetermined second ratio.

When the predetermined second ratio of the image in the inspection target image including the first determination image is included in a plurality of second determination images, the second extraction unit 13 exits the second extraction loop (step S17).

Next, the determination unit 12 determines the degree of possibility that the inspection object is displayed for each of the extracted plurality of second determination images (step S18). After the determination, the image inspection device 10 ends inspection processing.

With this configuration, the image inspection device can perform inspection processing at high speed by using learning type image recognition technology.

In addition, the determination unit 12 may determine the degree of possibility that the inspection object is displayed by using the prediction model generated by learning processing.

With this configuration, the image inspection device can perform inspection processing by using the prediction model generated by Convolutional Neural Network.

In addition, the image inspection device 10 may include a generation unit (for example, learning unit 106) configured to generate a prediction model representing a relationship between an image on which an inspection object is displayed and information indicating that the image is a display image of the inspection object with learning processing.

With this configuration, the image inspection device can generate a prediction model with the Convolutional Neural Network.

In addition, the information indicating that an image is a display image of an inspection object may include information indicating a position in an image in which the inspection object is displayed, and the determination unit 12 may use a prediction model to determine each of the degrees of possibility that the inspection object is displayed in a corresponding one of positions in a first determination image.

With this configuration, the image inspection device can obtain information on the position in the image where the inspection object is displayed.

In addition, the second extraction unit 13 may move a predetermined region on the basis of a position corresponding to the degree in a first determination image where a determined degree satisfies a predetermined condition.

With this configuration, the image inspection device can detect the inspection object with a higher probability.

In addition, the second extraction unit 13 may determine an image in an inspection target image including a first determination image on which a predetermined region is moved on the basis of each of the degrees of possibility that an inspection object is displayed in a corresponding one of the positions related to first determination images adjacent to a first determination image where a determined degree satisfies a predetermined condition.

With this configuration, the image inspection device can perform inspection processing faster.

Second Exemplary Embodiment

[Description of Configuration]

Figure 3:
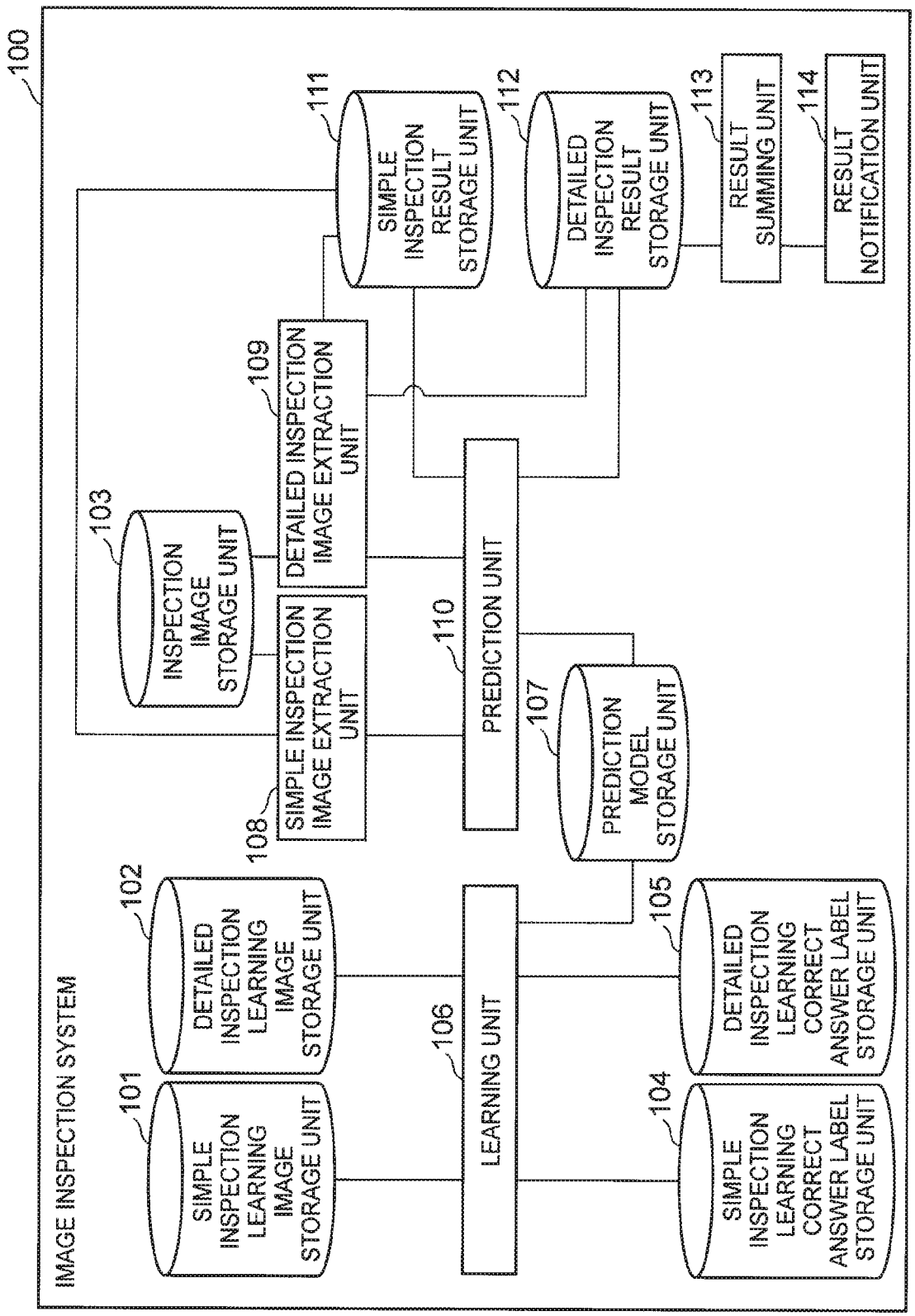
FIG. 3 is a block diagram showing a configuration example of a second exemplary embodiment of an image inspection system according to the present invention.

Next, a second exemplary embodiment of the present invention will be described with reference to the accompanying drawings. FIG. 3 is a block diagram showing a configuration example of a second exemplary embodiment of an image inspection system according to the present invention.

The image inspection system 100 of the present exemplary embodiment first performs simple inspection on the entire image when performing defective product inspection of products by using images taken of products. As a result of the simple inspection, the image inspection system 100 performs detailed inspection on a portion that may be recognized as having abnormalities in the image. That is, the image inspection system 100 of the present exemplary embodiment speeds up the whole inspection processing by performing a two-step inspection.

In addition, the image inspection system 100 of the present exemplary embodiment inspects a CD (Compact Disc) by using machine learning. It should be noted that the image inspection system 100 may inspect products other than CDs.

As shown in FIG. 3, the image inspection system 100 includes a simple inspection learning image storage unit 101, a detailed inspection learning image storage unit 102, an inspection image storage unit 103, a simple inspection learning correct answer label storage unit 104, a detailed inspection learning correct answer label storage unit 105, a learning unit 106, a prediction model storage unit 107, a simple inspection image extraction unit 108, a detailed inspection image extraction unit 109, a prediction unit 110, a simple inspection result storage unit 111, a detailed inspection result storage unit 112, a result summing unit 113, and a result notification unit 114.

The simple inspection learning image storage unit 101 stores image data used in machine learning of simple inspection. The size of the stored image is the size of an image to be extracted for inspection. It should be noted that the value of the size of the image to be extracted is a fixed value in each system.

Figure 4:
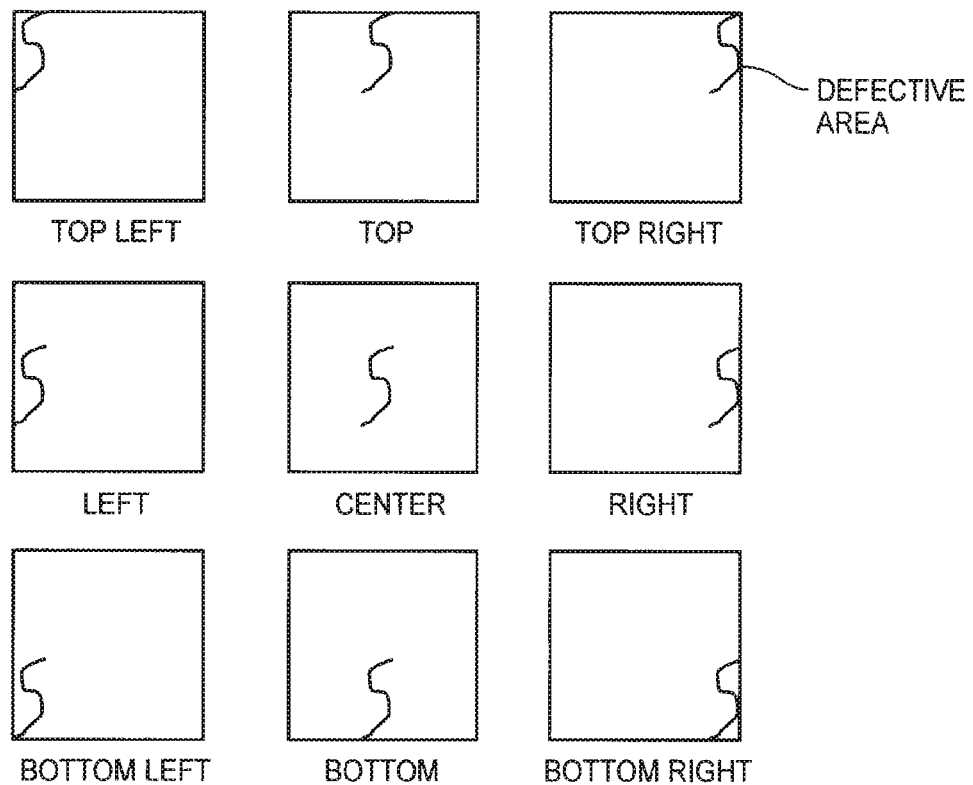
FIG. 4 is an explanatory diagram showing an example of images for machine learning of simple inspection.

The image stored in the simple inspection learning image storage unit 101 includes two kinds of images, a normal image and a defective image. FIG. 4 is an explanatory diagram showing an example of images for machine learning of simple inspection. The images shown in FIG. 4 are all defective images.

FIG. 4 shows nine defective images. For example, in the defective image written as "top right" in the bottom part, the defective area is displayed in the top right in the image. Similarly, in each of the defective images written as "top left", "top", "left", "center", "right", "bottom left", "bottom", and "bottom right", a defective area is displayed in a corresponding one of the positions in the image indicated by the name.

As shown in FIG. 4, in the simple inspection learning image storage unit 101 of the present exemplary embodiment, defective images for 9 positions (that is, nine defective images) in each of which a defective area corresponding to one piece of defective data is displayed in the designated position with respect to the defective data are stored.

The detailed inspection learning image storage unit 102 stores image data used in machine learning of detailed inspection. The image stored in the detailed inspection learning image storage unit 102 includes two kinds of images, a normal image and a defective image.

The inspection image storage unit 103 stores the inspection image data. The image stored in the inspection image storage unit 103 is an image with a relatively large size taken of the inspection product.

The simple inspection learning correct answer label storage unit 104 stores the correct answer label of the simple inspection learning image stored in the simple inspection learning image storage unit 101. The simple inspection learning correct answer label storage unit 104 stores correct answer labels, for example, in the form shown in FIG. 5.

FIG. 5 is an explanatory diagram showing an example of correct answer labels of simple inspection learning images. The correct answer label includes "filename" and "correct answer". As shown in FIG. 5, for example, the correct answer of the file name "A1.png" is "normal". That is, the "A1.png" is a file of a normal image.

In addition, as shown in FIG. 5, for example, the correct answer of the file name "A3.png" is "top right". That is, the "A3.png" is a file of a defective image in which a defective area is displayed in the top right in the image. Other correct answer labels also have the similar meaning.

The detailed inspection learning correct answer label storage unit 105 stores the correct answer label of the detailed inspection learning image stored in the detailed inspection learning image storage unit 102. The detailed inspection learning correct answer label storage unit 105 stores correct answer labels, for example, in the form shown in FIG. 6.

FIG. 6 is an explanatory diagram showing an example of correct answer labels of detailed inspection learning images. The correct answer label includes "file name" and "correct answer". As shown in FIG. 6, for example, the correct answer of the file name "B1.png" is "normal". That is, the "B1.png" is a file of a normal image.

In addition, as shown in FIG. 6, for example, the correct answer of the file name "B5.png" is "defective". That is, the "B5.png" is a file of a defective image. Other correct answer labels also have the similar meaning.

The learning unit 106 generates a prediction model by learning the relationship between the learning image and the correct answer label of the learning image. The learning unit 106 retrieves a simple inspection learning image from the simple inspection learning image storage unit 101, and a correct answer label of the corresponding simple inspection learning image from the simple inspection learning correct answer label storage unit 104. Then, the learning unit 106 generates a simple inspection prediction model using the retrieved data.

In addition, the learning unit 106 retrieves a detailed inspection learning image from the detailed inspection learning image storage unit 102, and a correct answer label of the corresponding detailed inspection learning image from the detailed inspection learning correct answer label storage unit 105. Then, the learning unit 106 generates a detailed inspection prediction model using the retrieved data.

The prediction model to be generated is a model representing the relationship between the image and the correct answer label. As a method for generating a prediction model, the learning unit 106 uses, for example, a Convolutional Neural Network (hereinafter referred to as CNN). It should be noted that the learning unit 106 may use a method for generating prediction models other than CNN.

The learning unit 106 adds the generated prediction model to the prediction model storage unit 107. The prediction model storage unit 107 stores the prediction model generated by the learning unit 106.

The simple inspection image extraction unit 108 retrieves the inspection image from the inspection image storage unit 103 to extract the simple inspection image from the retrieved inspection image. The simple inspection image extraction unit 108 sets the extraction target region in the inspection image to extract the image of the extraction target region as a simple inspection image.

After extracting one simple inspection image, the simple inspection image extraction unit 108 moves the extraction target region to extract another simple inspection image again. The simple inspection image extraction unit 108 passes the extracted simple inspection image to the prediction unit 110.

Figure 7:
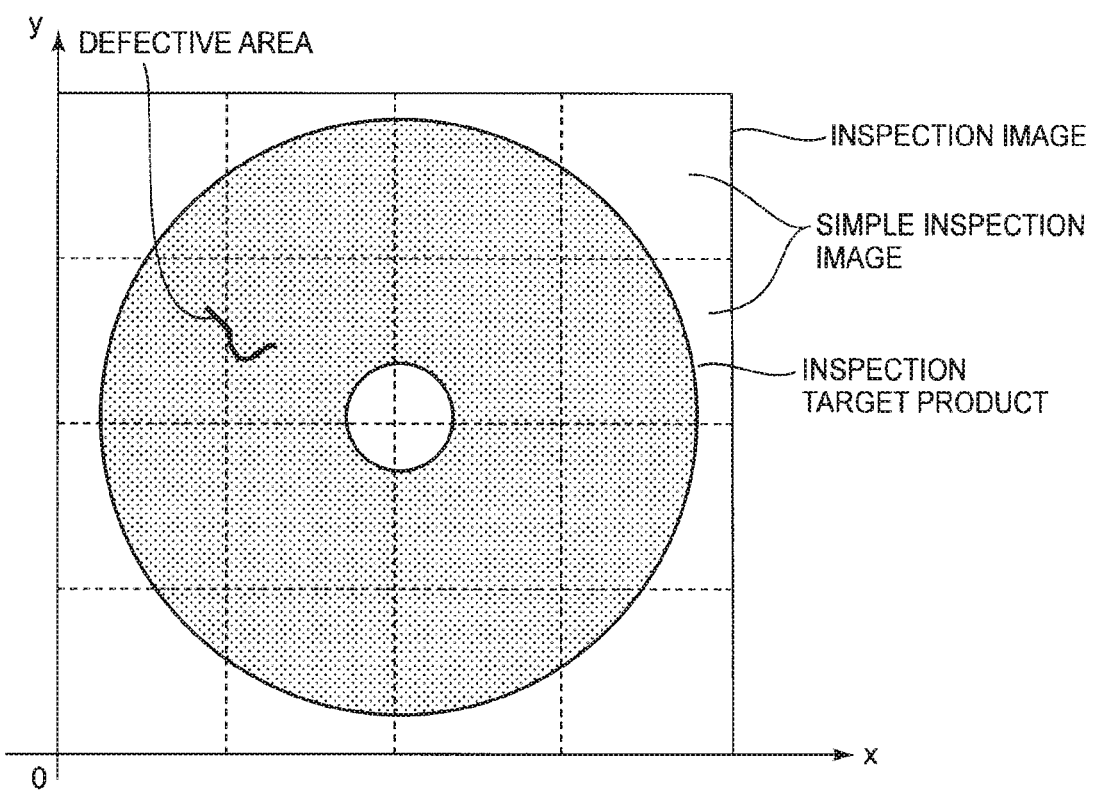
FIG. 7 is an explanatory diagram showing an example of a simple inspection image to be extracted by the simple inspection image extraction unit 108.

FIG. 7 is an explanatory diagram showing an example of a simple inspection image to be extracted by the simple inspection image extraction unit 108. FIG. 7 shows an inspection image taken of the inspection target product. In addition, a defective area exists in the inspection target product shown in FIG. 7. In addition, each of the 16 images separated by broken lines in the inspection image shown in FIG. 7 corresponds to a simple inspection image.

In addition, the x and y axes shown in FIG. 7 are used to represent the position where the extraction target region is set. The simple inspection image extraction unit 108 associates the file name of the extracted simple inspection image with the information indicating the position of the extracted simple inspection image in the original inspection image to add to the simple inspection result storage unit 111.

It should be noted that the simple inspection image extraction unit 108 may extract the simple inspection image in such a manner that the whole inspection image is included in the simple inspection images as shown in FIG. 7. In addition, the simple inspection image extraction unit 108 may extract the simple inspection image in such a manner that a predetermined ratio of the inspection image is included in the simple inspection images. For example, if the inspection image contains a blank region such as a margin, the simple inspection image extraction unit 108 may extract the simple inspection image in such a manner that the whole image excluding the blank regions is included in the simple inspection images.

The detailed inspection image extraction unit 109 retrieves the simple inspection result from the simple inspection result storage unit 111 to identify the place where the defective area may exist in the original inspection image. Then, the detailed inspection image extraction unit 109 retrieves the inspection image from the inspection image storage unit 103 to extract a detailed inspection image from the identified place where the defective area may exist.

The detailed inspection image extraction unit 109 sets the extraction target region in the identified place to extract the image of the extraction target region as a detailed inspection image. After extracting one detailed inspection image, the detailed inspection image extraction unit 109 moves the extraction target region in the direction in which the defective area is expected to exist to extract another detailed inspection image again. It should be noted that the width by which the detailed inspection image extraction unit 109 moves the extraction target region is smaller than the width by which the simple inspection image extraction unit 108 moves the extraction target region.

Figure 8:
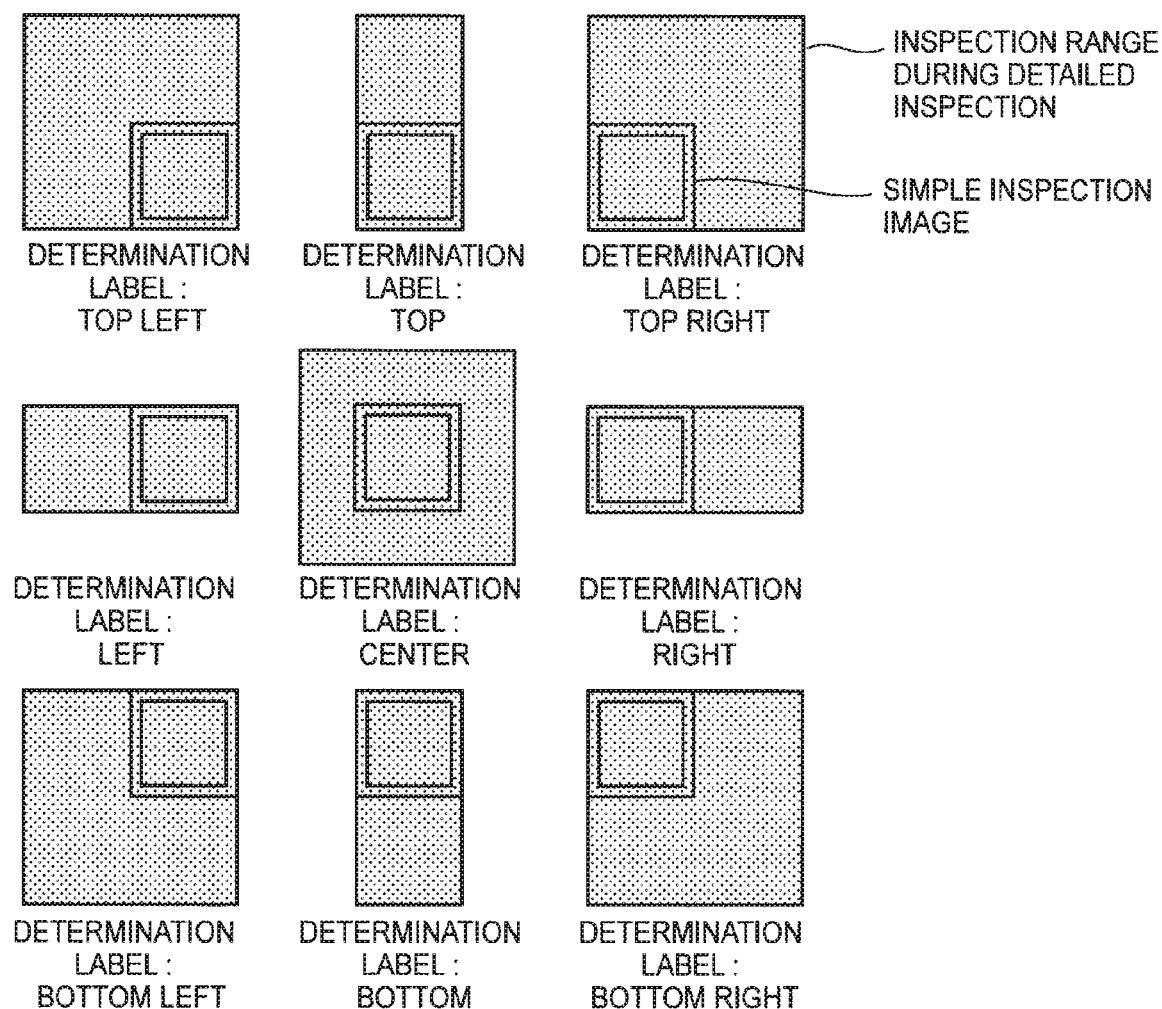
FIG. 8 is an explanatory diagram showing an example of the range in which the detailed inspection image extraction unit 109 extracts the detailed inspection image.

FIG. 8 is an explanatory diagram showing an example of the range in which the detailed inspection image extraction unit 109 extracts the detailed inspection image. As shown in FIG. 8, the region surrounded by the double line corresponds to the simple inspection image, and the region indicated with the shading corresponds to the inspection range during detailed inspection.

For example, for the simple inspection image where the determination score of the correct answer label "top right" is the highest by simple inspection, the detailed inspection image extraction unit 109 includes the top part, the top right part, and the right part of the simple inspection image in the inspection range during detailed inspection.

Similarly, the detailed inspection image extraction unit 109 includes the top part of the simple inspection image where the determination score of the correct answer label "top" is the highest in the inspection range during detailed inspection, and includes the left part of the simple inspection image where the determination score of the correct answer label "left" is the highest in the inspection range during detailed inspection.

In addition, the detailed inspection image extraction unit 109 includes the right part of the simple inspection image where the determination score of the correct answer label "right" is the highest in the inspection range during detailed inspection, and includes the bottom part of the simple inspection image where the determination score of the correct answer label "bottom" is the highest in the inspection range during detailed inspection.

In addition, the detailed inspection image extraction unit 109 includes the top left part, the top part, and the left part of the simple inspection image where the determination score of the correct answer label "top left" is the highest in the inspection range during detailed inspection, and includes the left part, the bottom left part, and the bottom part of the simple inspection image where the determination score of the correct answer label "bottom left" is the highest in the inspection range during detailed inspection.

In addition, the detailed inspection image extraction unit 109 includes the right part, the bottom part, and the bottom right part of the simple inspection image where the determination score of the correct answer label "bottom right" is the highest in the inspection range during detailed inspection, and includes the top left part, the top part, the top right part, the left part, the right part, the bottom left part, the bottom part, and the bottom right part of the simple inspection image where the determination score of the correct answer label "center" is the highest in the inspection range during detailed inspection.

In the simple inspection of the simple inspection image positioned the second from the top and the first from the left in the example shown in FIG. 7, the result that the correct answer label with the highest determination score is "right" is obtained.

Figure 9:
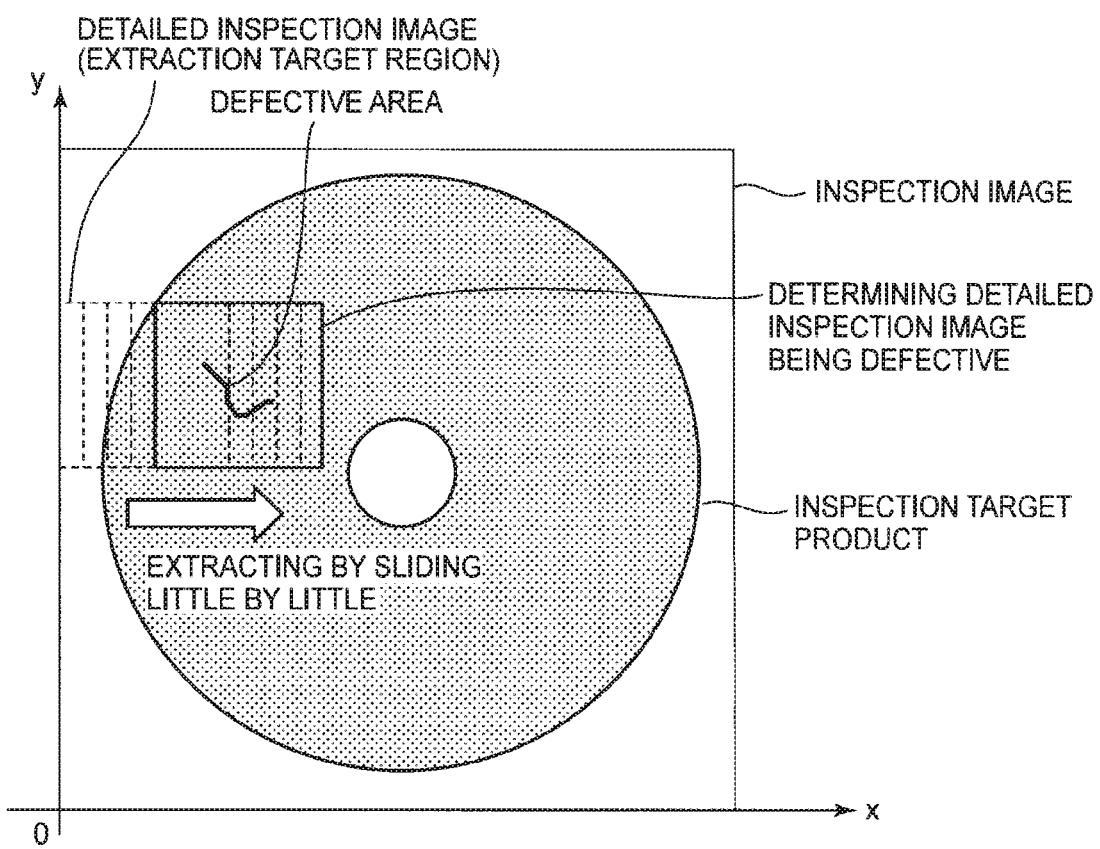
FIG. 9 is an explanatory diagram showing an example of a detailed inspection image to be extracted by the detailed inspection image extraction unit 109.

FIG. 9 is an explanatory diagram showing an example of a detailed inspection image to be extracted by the detailed inspection image extraction unit 109. The x and y axes shown in FIG. 9 are used to represent the position where the extraction target region is set.

On the basis of the simple inspection result that the correct answer label with the highest determination score is "right", the detailed inspection image extraction unit 109 moves the extraction target region little by little to the right as shown in FIG. 9. The detailed inspection image extraction unit 109 extracts the image of the extraction target region as a detailed inspection image each time the extraction target region is moved.

Of the defective determination scores for the detailed inspection images extracted in the above method, the defective determination score for the detailed inspection image in which the defective area as shown in FIG. 9 is completely displayed is the highest. The detailed inspection image extraction unit 109 passes the extracted detailed inspection image to the prediction unit 110.

In addition, the detailed inspection image extraction unit 109 associates the file name of the extracted detailed inspection image with the information indicating the position of the extracted detailed inspection image in the original inspection image to add to the detailed inspection result storage unit 112.

It should be noted that the detailed inspection image extraction unit 109 may extract the detailed inspection image in such a manner that the whole image in the inspection range during detailed inspection is included in the detail inspection images as shown in FIG. 9. In addition, the detailed inspection image extraction unit 109 may extract the detailed inspection image in such a manner that a predetermined ratio of the image in the inspection range during detailed inspection is included in the detailed inspection images. For example, if the image in the inspection range during detailed inspection contains a blank region such as a margin, the detailed inspection image extraction unit 109 may extract the detailed inspection image in such a manner that the whole image excluding the blank regions is included in the detailed inspection images.

Figure 10:
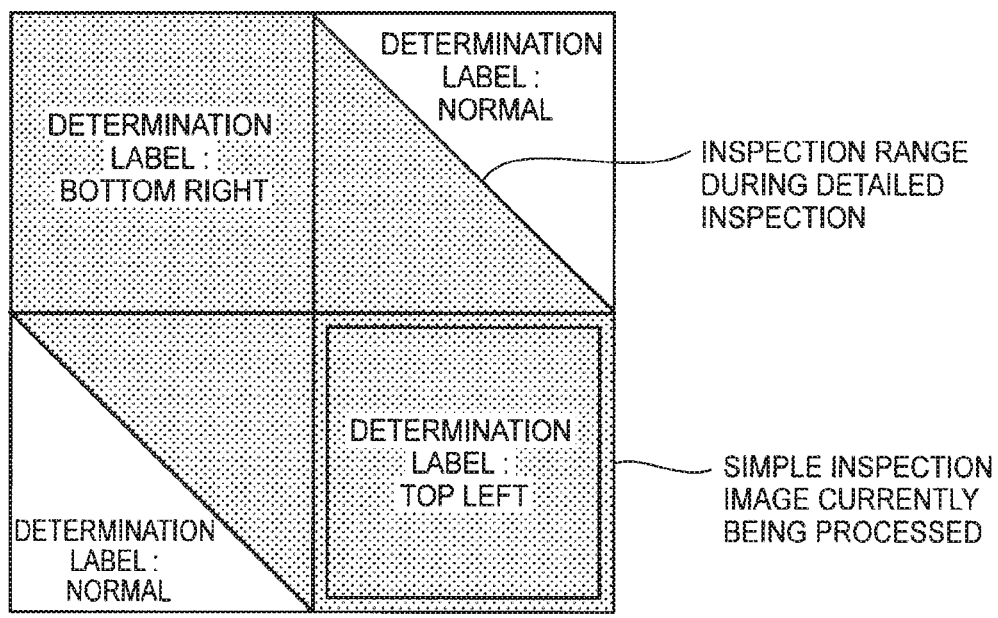
FIG. 10 is an explanatory diagram showing another example of the range in which the detailed inspection image extraction unit 109 extracts the detailed inspection image.

It should be noted that the detailed inspection image extraction unit 109 may extract the detailed inspection image in the method shown below. FIG. 10 is an explanatory diagram showing another example of the range in which the detailed inspection image extraction unit 109 extracts the detailed inspection image. The region surrounded by the double line shown in FIG. 10 corresponds to the simple inspection image currently being processed.

When extracting the detailed inspection image, the detailed inspection image extraction unit 109 checks the correct answer label where the determination score of the simple inspection image adjacent to the simple inspection image of the original score determination is the highest. The adjacent simple inspection image is a simple inspection image existing within the initial range from which the detailed inspection image shown in FIG. 10 is extracted, for example.

If the position indicated by the correct answer label where the determination score of the adjacent simple inspection image is the highest is exactly opposite to the position indicated by the correct answer label where the determination score of the simple inspection image currently being processed is the highest, there is a high possibility that a defective area exists between the simple inspection images. Therefore, the detailed inspection image extraction unit 109 narrows the extraction range down to between simple inspection images to extract the detailed inspection image.

In the example shown in FIG. 10, the correct answer label where the determination score of the simple inspection image currently being processed is the highest is "top left". In addition, the correct answer labels with the highest determination score of the top left simple inspection image, the top simple inspection image, and the left simple inspection image of the simple inspection image currently being processed are respectively "bottom right", "normal", and "normal".

Therefore, the detailed inspection image extraction unit 109 decides that there is a high possibility of a defective area existing between the simple inspection image currently being processed and the top left simple inspection image to set only the range between both images to the inspection range during detailed inspection.

Therefore, as shown in FIG. 10, the region indicated with the shading is set to the inspection range during detailed inspection. When the above method is used, since the extraction range of the detailed inspection image is further limited, the detailed inspection processing is executed faster.

The prediction unit 110 uses the prediction model to determine the inspection image. The prediction unit 110 retrieves the stored prediction model from the prediction model storage unit 107. In addition, a simple inspection image is input into the prediction unit 110 from the simple inspection image extraction unit 108, and a detailed inspection image is input into the prediction unit 110 from the detailed inspection image extraction unit 109.

The prediction unit 110 generates a determination score for the input image for determination. The prediction unit 110 uses CNN, for example, for determination processing. The prediction unit 110 stores the generated determination score in the simple inspection result storage unit 111 and the detailed inspection result storage unit 112.

The simple inspection result storage unit 111 stores a determination score for each correct answer label of the simple inspection image. The simple inspection result storage unit 111 stores the determination scores, for example, in the form shown in FIG. 11. FIG. 11 is an explanatory diagram showing an example of the simple inspection result.

As shown in FIG. 11, the simple inspection result includes the "original file name", the "simple inspection image file name", the "x coordinate", the "y coordinate", and a corresponding one of the determination scores for each of the correct answer labels.

The "original file name" is the file name of the original inspection image stored in the inspection image storage unit 103. The "simple inspection image file name" is the file name of a simple inspection image extracted by the simple inspection image extraction unit 108. The "x coordinate"

and the "y coordinate" are coordinate values determined by a predetermined standard indicating the position of the simple inspection image in the original inspection image.

Any value between 0 and 1 depending on the determination result is stored in a determination score for each correct answer label. As the simple inspection image is more similar to the simple inspection learning image corresponding to each correct answer label, a value closer to 1 is stored in the determination score. In addition, as the simple inspection learning image corresponding to each correct answer label and the simple inspection image are more dissimilar, a value closer to 0 is stored in the determination score.

For example, "0.0" is stored in the correct answer label "score normal" of the second simple inspection result from the top shown in FIG. 11. That is, the simple inspection image "1_000_100.png" is not at all similar to the normal image. In addition, "0.9" is stored in the correct answer label "score top right". That is, the simple inspection image "1_000_100.png" is similar to the defective image in which a defective area is displayed in the top right with a high probability.

The detailed inspection result storage unit 112 stores the quality determination result of the detailed inspection image. The detailed inspection result storage unit 112 stores the determination result, for example, in the form shown in FIG. 12. FIG. 12 is an explanatory diagram showing an example of the detailed inspection result.

As shown in FIG. 12, the detailed inspection result includes "original file name", "detailed inspection image file name", "x coordinate", "y coordinate", and "score".

The "original filename" is the file name of the original inspection image stored in the inspection image storage unit 103. The "detailed inspection image file name" is the filename of a detailed inspection image extracted by the detailed inspection image extraction unit 109. The "x coordinate" and the "y coordinate" are coordinate values determined by a predetermined standard indicating the position of the detailed inspection image in the original inspection image.

Any value between 0 and 1 depending on the determination result is stored in "score". As the detailed inspection image is more similar to a defective image being a detailed inspection learning image, a value closer to 1 is stored in the score. In addition, as the detailed inspection image is more similar to a normal image being a detailed inspection learning image, a value closer to 0 is stored in the score.

For example, "0.0" is stored in the score of the second detailed inspection result from the top shown in FIG. 12. That is, the detailed inspection image "1_000_010.png" matches the normal image. In addition, "0.3" is stored in the score of the fourth detailed inspection result from the top. That is, the detailed inspection image "1_010_000.png" is relatively similar to the defective image.

The result summing unit 113 retrieves the determination result included in the detailed inspection result from the detailed inspection result storage unit 112. The result summing unit 113 performs the quality determination on the entire inspection image by using the determined score of each detailed inspection image. The result summing unit 113 passes the result of the quality determination to the result notification unit 114.

The result notification unit 114 notifies the user of the result of the quality determination received from the result summing unit 113. The result notification unit 114 displays, for example, the result of the quality determination on the screen.

The image inspection system 100 of the present exemplary embodiment is an inspection system for extracting images from inspection images to perform the quality determination on each extracted image when performing defective product inspection by using images.

The image inspection system 100 initially moves the extraction target region relatively largely to perform inspection when extracting images. When performing inspection, the image inspection system 100 identifies which position in the extracted image the defective area exists.

After the place where the defective area may exist is found by inspection, the image inspection system 100 moves the extraction target region relatively small in the found place to perform inspection. When performing inspection, the image inspection system 100 performs inspection on the basis of the position where the defective area exists. As described above, since the number of images to be determined decreases, the image inspection system 100 can speed up the inspection processing.

[Description of Operation]

In the following, the operation of the image inspection system 100 of the present exemplary embodiment will be described with reference to FIGS. 13 to 17. The image inspection system 100 of the present exemplary embodiment performs two pieces of processing, learning processing and inspection processing when performing image inspection.

Figure 13:
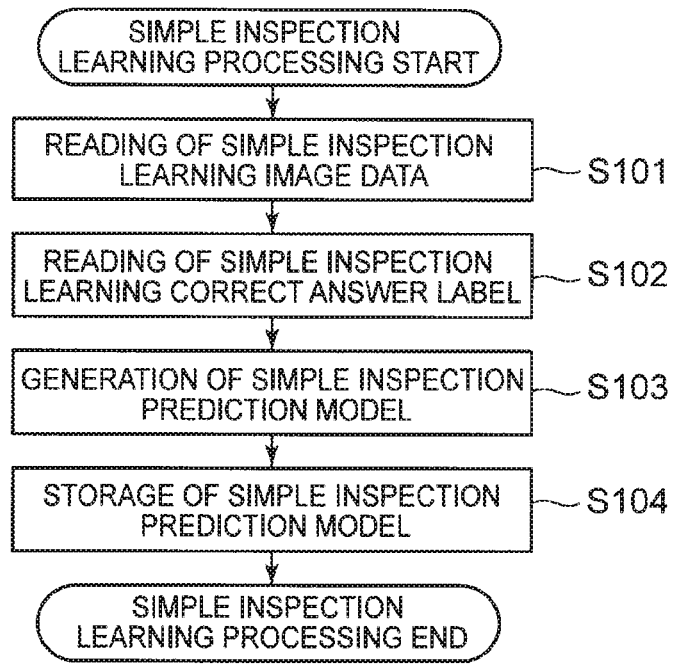
FIG. 13 is a flowchart showing the operation of simple inspection learning processing by the learning unit 106 of the second exemplary embodiment.

In the following, the operation of learning processing by the image inspection system 100 will be described. The learning processing includes two pieces of processing: simple inspection learning processing and detailed inspection learning processing. First, the simple inspection learning processing will be described with reference to FIG. 13. FIG. 13 is a flowchart showing the operation of simple inspection learning processing by the learning unit 106 of the second exemplary embodiment.

The learning unit 106 reads the data of the simple inspection learning image from the simple inspection learning image storage unit 101 (step S101). Then, the learning unit 106 reads the simple inspection learning correct answer label from the simple inspection learning correct answer label storage unit 104 (step S102).

Then, the learning unit 106 generates a simple inspection prediction model by learning the relationship between the read simple inspection learning image and the simple inspection learning correct answer label (step S103). Then, the learning unit 106 stores the generated simple inspection prediction model in the prediction model storage unit 107 (step S104). After the storage, the learning unit 106 ends the simple inspection learning processing.

Figure 14:
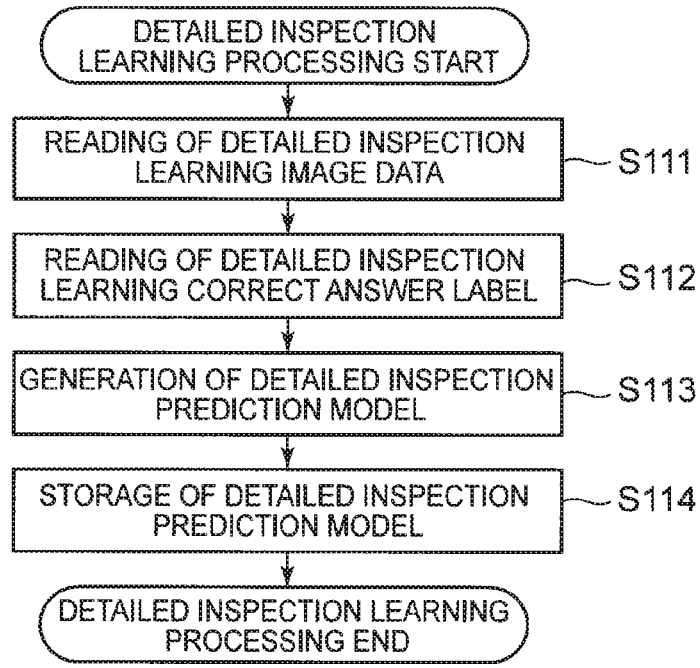
FIG. 14 is a flowchart showing the operation of detailed inspection learning processing by the learning unit 106 of the second exemplary embodiment.

Next, the detailed inspection learning processing will be described with reference to FIG. 14. FIG. 14 is a flowchart showing the operation of detailed inspection learning processing by the learning unit 106 of the second exemplary embodiment.

The learning unit 106 reads the data of the detailed inspection learning image from the detailed inspection learning image storage unit 102 (step S111). Then, the learning unit 106 reads the detailed inspection learning correct answer label from the detailed inspection learning correct answer label storage unit 105 (step S112).

Then, the learning unit 106 generates a detailed inspection prediction model by learning the relationship between the read detailed inspection learning image and the detailed inspection learning correct answer label (step S113). Then, the learning unit 106 stores the generated detailed inspection prediction model in the prediction model storage unit 107

(step S114). After the storage, the learning unit 106 ends the detailed inspection learning processing.

Figure 15:
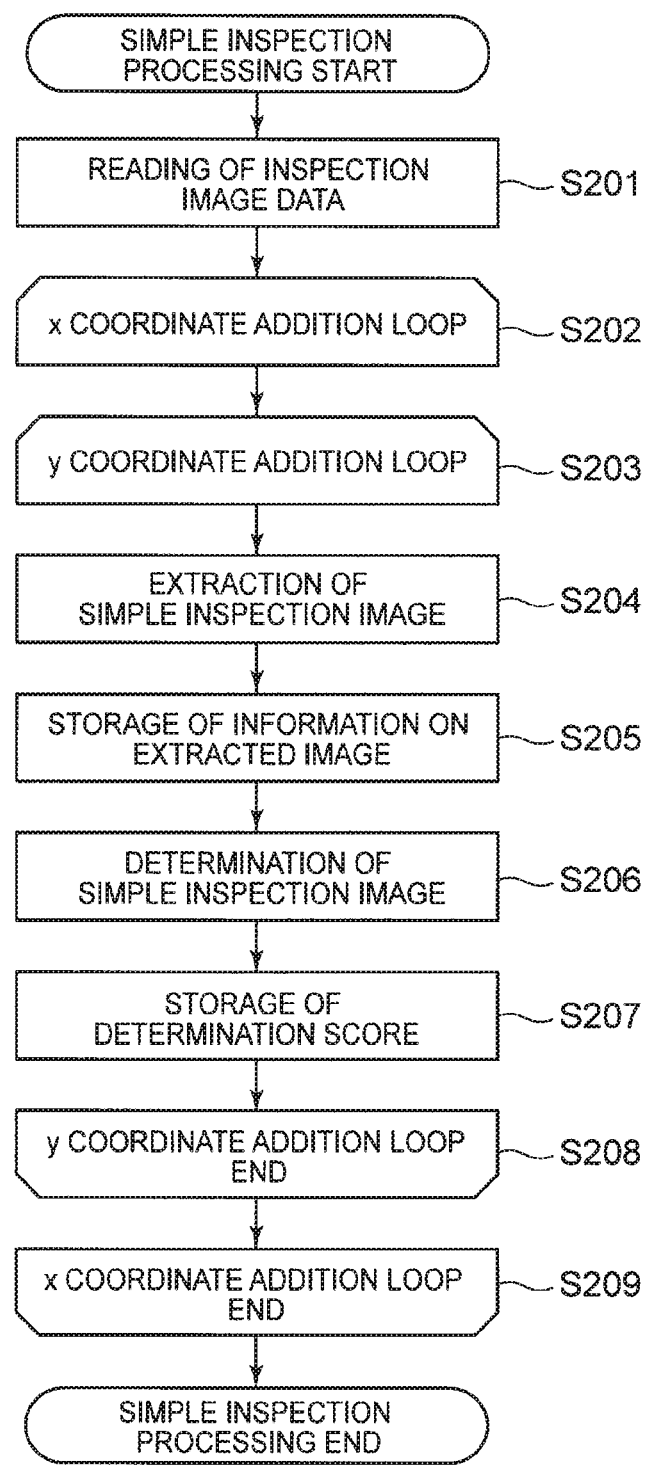
FIG. 15 is a flowchart showing the operation of simple inspection processing by the image inspection system 100 of the second exemplary embodiment.

In the following, the operation of inspection processing by the image inspection system 100 will be described. The inspection processing includes three pieces of processing: simple inspection processing, detailed inspection processing, and result summing processing. First, the simple inspection processing will be described with reference to FIG. 15. FIG. 15 is a flowchart showing the operation of simple inspection processing by the image inspection system 100 of the second exemplary embodiment.

The simple inspection image extraction unit 108 reads the inspection image data from the inspection image storage unit 103 (step S201).

Then, the simple inspection image extraction unit 108 adds a predetermined value to the x coordinate in the read inspection image (step S202). That is, the process enters the x coordinate addition loop. It should be noted that the initial value of the x coordinate is 0. In addition, the predetermined value to be added to the x coordinate matches the width of the simple inspection image to be extracted.

Then, the simple inspection image extraction unit 108 adds a predetermined value to the y coordinate in the read inspection image (step S203). That is, the process enters the y coordinate addition loop. It should be noted that the initial value of the y coordinate is 0. In addition, the predetermined value to be added to the y coordinate matches the height of the simple inspection image to be extracted.

Then, on the basis of the computed coordinates (x, y), the simple inspection image extraction unit 108 extracts a simple inspection image having a width of the predetermined value added in step S202 and a height of the predetermined value added in step S203 from the inspection image (step S204).

Then, the simple inspection image extraction unit 108 stores information on the simple inspection image extracted in step S204 in the simple inspection result storage unit 111 (step S205). The information on the simple inspection image includes the file name of the inspection image read in step S201, the file name of the simple inspection image extracted in step S204, the x coordinate computed in step S202, and the y coordinate computed in step S203.

Then, the prediction unit 110 performs the quality determination of the extracted simple inspection image by using the simple inspection prediction model stored in the prediction model storage unit 107. In addition, when a scratch is displayed in a simple inspection image, the prediction unit 110 performs the position determination of the scratch. That is, the prediction unit 110 determines how similar the simple inspection image is to the simple inspection learning images corresponding to the respective correct answer labels (step S206).

Then, the prediction unit 110 stores the determination score obtained in step S206 in the simple inspection result storage unit 111 (step S207). Each of the determination scores is stored in a corresponding one of the simple inspection results including information on the simple inspection image stored in step S205.

The simple inspection image extraction unit 108 and the prediction unit 110 repeatedly execute the processing in steps S204 to S207 while the y coordinate to be computed is less than the height of the inspection image. The processing in steps S204 to S207 is repeated as many times as the number of the heights of the simple inspection images included in the height of the inspection image for each simple inspection image.

When the computed y coordinate is more than the height of the inspection image, the simple inspection image extraction unit 108 exits they coordinate addition loop (step S208). After exiting the y coordinate addition loop, the simple inspection image extraction unit 108 performs the processing in step S209.

The simple inspection image extraction unit 108 and the prediction unit 110 repeatedly execute the processing insteps S203 to S208 while the x coordinate to be computed is less than the width of the inspection image. The processing in steps S203 to S208 is repeated as many times as the number of the widths of the simple inspection images included in the width of the inspection image for each simple inspection image.

When the computed x coordinate is more than the width of the inspection image, the simple inspection image extraction unit 108 exits the x coordinate addition loop (step S209). After exiting the x coordinate addition loop, the image inspection system 100 ends the simple inspection processing. After ending the simple inspection processing, the image inspection system 100 performs the detailed inspection processing.

Figure 16:
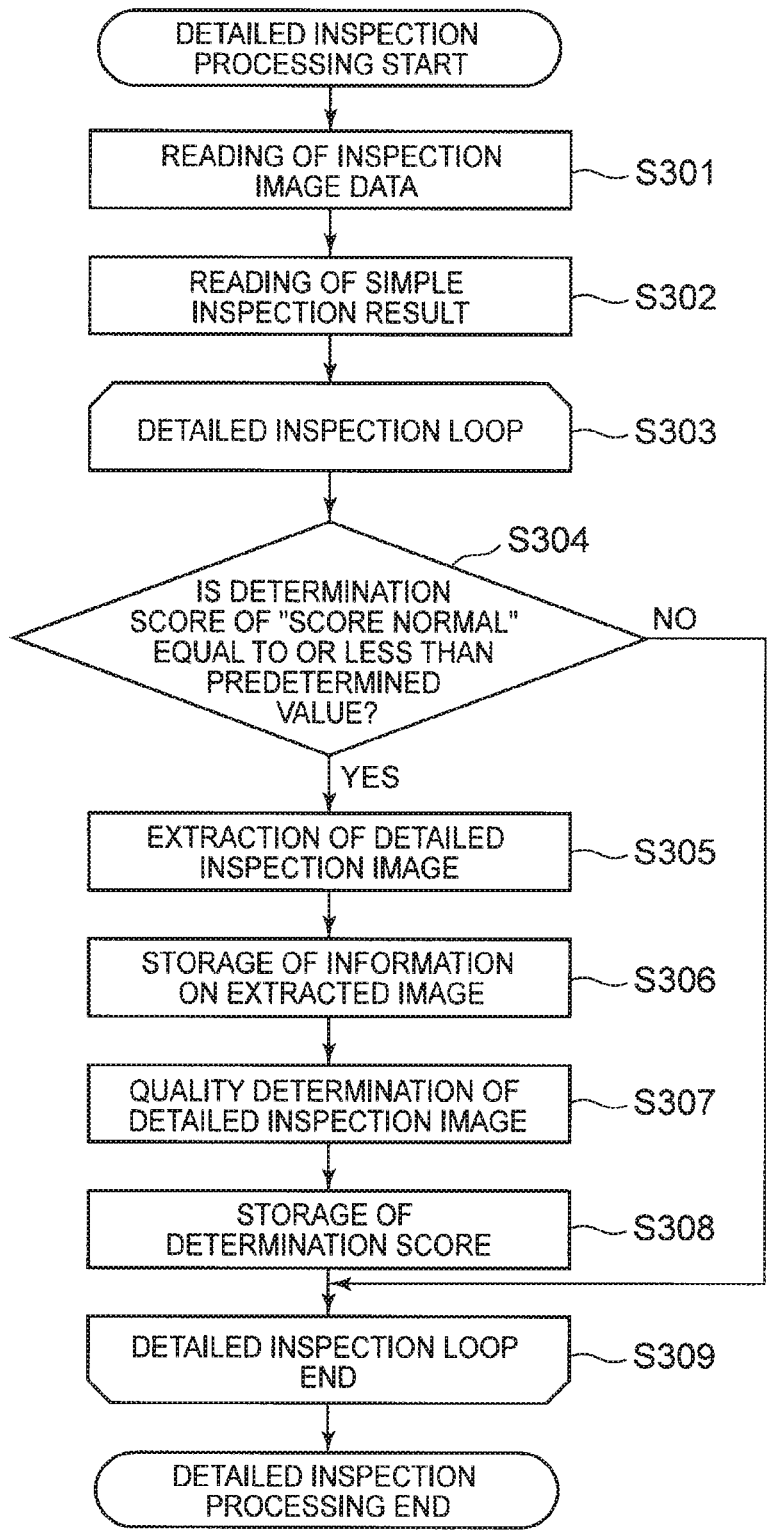
FIG. 16 is a flowchart showing the operation of detailed inspection processing by the image inspection system 100 of the second exemplary embodiment.

Next, the detailed inspection processing will be described with reference to FIG. 16. FIG. 16 is a flowchart showing the operation of detailed inspection processing by the image inspection system 100 of the second exemplary embodiment.

The detailed inspection image extraction unit 109 reads the inspection image data from the inspection image storage unit 103 (step S301). Then, the detailed inspection image extraction unit 109 reads the simple inspection result related to the read inspection image from the simple inspection result storage unit 111 (step S302).

Then, the detailed inspection image extraction unit 109 reads pieces of inspection result information included in the read simple inspection result one by one. That is, the process enters the detailed inspection loop (step S303). It should be noted that the inspection result information to be read is information on the simple inspection result for one simple inspection image extracted from the inspection image.

Then, the detailed inspection image extraction unit 109 checks whether the "score normal" determination score included in the read inspection result information is equal to or less than a predetermined value (step S304). For example, when an image where there is any possibility of a defective area existing is a target of the detailed inspection, the predetermined value is set as large as possible.

If the "score normal" determination score is larger than the predetermined value (No in step S304), the detailed inspection image extraction unit 109 advances the process to step S309.

If the "score normal" determination score is equal to or less than the predetermined value (Yes in step S304), the detailed inspection image extraction unit 109 acquires the correct answer label with the highest determination score among the correct answer labels other than "score normal" included in the inspection result information.

Then, the detailed inspection image extraction unit 109 extracts the detailed inspection image on the basis of the position indicated by the acquired correct answer label (step S305). The detailed inspection image to be extracted is an image of the extraction target region shifted little by little in the inspection range during detailed inspection, for example, shown in FIG. 8.

Then, the detailed inspection image extraction unit 109 stores information on all the detailed inspection images extracted in step S305 in the detailed inspection result storage unit 112 (step S306). The information on the detailed inspection image includes a file name of the inspection image read in step S301, a file name of the detailed inspection image extracted in step S305, and coordinates (x, y) indicating the position of the extracted detailed inspection image.

Then, the prediction unit 110 performs quality determination on all the extracted detailed inspection images by using the detailed inspection prediction model stored in the prediction model storage unit 107 (step S307).

Then, the prediction unit 110 stores the determination score obtained in step S307 in the detailed inspection result storage unit 112 (step S308). Each of the determination scores is stored in a corresponding one of the detailed inspection results including information on the detailed inspection image stored in step S306.

The detailed inspection image extraction unit 109 and the prediction unit 110 repeatedly execute the processing in steps S304 to S308 while the unprocessed inspection result information is included in the read simple inspection result. The processing in steps S304 to S308 is repeated as many times as the number of the pieces of inspection result information included in the simple inspection result for each piece of inspection result information.

When all pieces of the inspection result information included in the simple inspection result are processed, the detailed inspection image extraction unit 109 exits the detailed inspection loop (step S309). After exiting the detailed inspection loop, the image inspection system 100 ends the detailed inspection processing. After ending the detailed inspection processing, the image inspection system 100 performs result summing processing.

Figure 17:
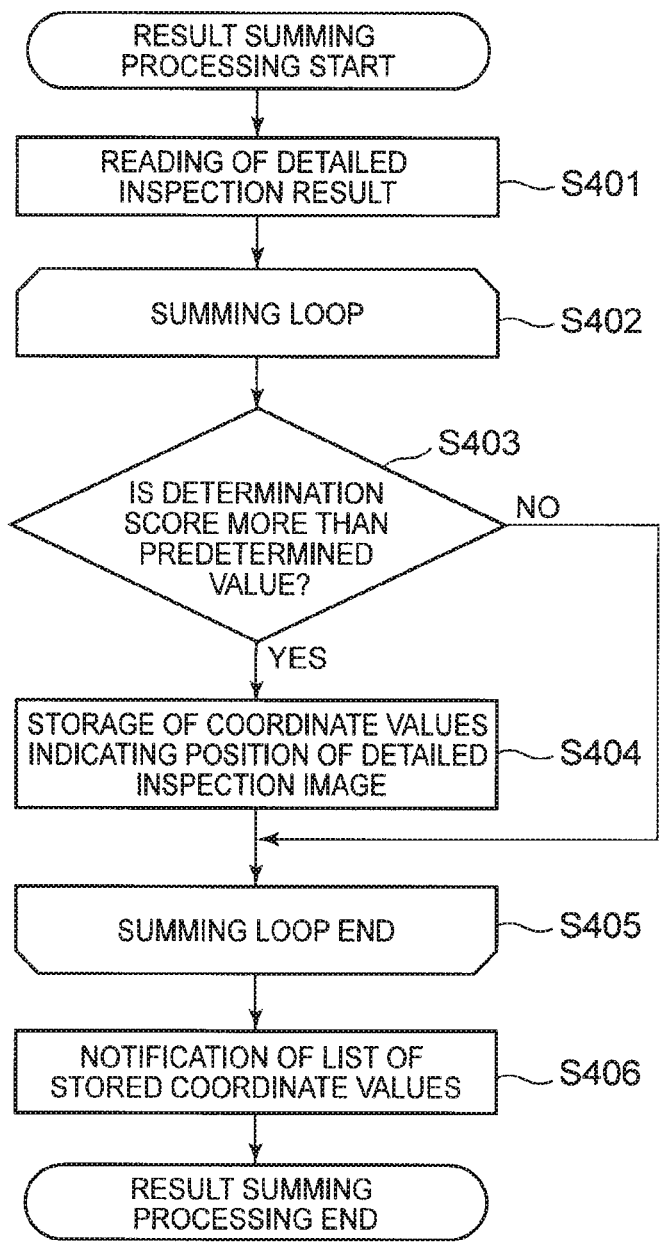
FIG. 17 is a flowchart showing the operation of result summing processing by the image inspection system 100 of the second exemplary embodiment.

Next, the result summing processing will be described with reference to FIG. 17. FIG. 17 is a flowchart showing the operation of result summing processing by the image inspection system 100 of the second exemplary embodiment.

The result summing unit 113 reads the detailed inspection result related to one inspection image from the detailed inspection result storage unit 112 (step S401).

Then, the result summing unit 113 reads pieces of inspection result information included in the read detailed inspection result one by one. That is, the process enters the summing loop (step S402). It should be noted that the inspection result information to be read is information on the detailed inspection result for one detailed inspection image extracted from the inspection image.

Then, the result summing unit 113 checks whether the determination score included in the read inspection result information is more than a predetermined value (step S403). For example, when an image taken of a product definitely determined as "defective" is selected, the predetermined value is set as large as possible.

If the determination score is smaller than the predetermined value (No in step S403), the result summing unit 113 advances the process to step S405.

If the determination score is more than the predetermined value (Yes in step S403), the result summing unit 113 stores the x coordinate and the y coordinate indicating the position of the detailed inspection image included in the inspection result information in a temporary storage device (not shown) (step S404).

The result summing unit 113 repeatedly executes the processing in steps S403 to S404 while the unprocessed inspection result information is included in the read detailed inspection result. The processing in steps S403 to S404 is repeated as many times as the number of the pieces of inspection result information included in the detailed inspection result for each piece of inspection result information.

When all pieces of the inspection result information included in the detailed inspection result are processed, the result summing unit 113 exits the summing loop (step S405). After exiting the summing loop, the result summing unit 113 notifies the result notification unit 114 of a list of the x coordinate and the y coordinate indicating the position of the detailed inspection image where the defective determination score is more than a predetermined value (step S406). After the notification of the list of the coordinate values, the image inspection system 100 ends the result summing processing.

[Description of Effect]

When performing defective product inspection on an image, the image inspection system 100 of the present exemplary embodiment initially makes the movement width of the extraction target region relatively large to extract an image to perform inspection. As a result of inspection, when a place where a defective area may exist is found, the image inspection system 100 makes the movement width of the extraction target region relatively small to extract an image on the basis of the position where the defective area is considered to exist to perform inspection. Therefore, since the number of the inspection target images decreases, even when an inspection method of extracting small images to perform quality determination on each extracted image is used, defective product inspection is performed at high speed.

The learning unit 106 of the image inspection system 100 of the present exemplary embodiment learns in advance the learning target image, including the position of the defective area displayed in the image. In addition, in the present exemplary embodiment, image inspection is performed in two stages of simple inspection and detailed inspection.

In the simple inspection, the simple inspection image extraction unit 108 makes the movement width of the extraction target region relatively large to extract a simple inspection image. Then, the prediction unit 110 performs inspection on each simple inspection image. During inspection, the prediction unit 110 identifies whether a defective area may exist in each simple inspection image. In addition, if a defective area exists, the prediction unit 110 identifies which position in the simple inspection image the defective area exists.

In the detailed inspection, the detailed inspection image extraction unit 109 extracts a detailed inspection image on the basis of the position where the defective area exists from the periphery of the simple inspection image where a defective area may exist identified by simple inspection. The detailed inspection image extraction unit 109 extracts a detailed inspection image while moving the extraction target region little by little on the basis of the position where the defective area exists. Then, the prediction unit 110 performs inspection on each detailed inspection image.

The techniques for performing identification and detection while shifting the extraction target region little by little are described in PTL 1 and PTL 2. However, unlike the techniques described in PTL 1 and PTL 2, in the present exemplary embodiment, changing the movement amount of the extraction target region in two stages allows inspection processing to be performed at high speed.

In addition, unlike the technique described in PTL 3, in the present exemplary embodiment, reducing the amount of data of the image read by detailed inspection allows inspection processing to be performed at high speed. Therefore, the image inspection system 100 of the present exemplary embodiment can perform inspection processing at high speed by using only the learning type image recognition technology.

It should be noted that the image inspection device 10 and the image inspection system 100 of each exemplary embodiment is achieved, for example, by a CPU (Central Processing Unit) for executing processing according to a program stored in a storage medium. That is, the first extraction unit 11, the determination unit 12, the second extraction unit 13, the learning unit 106, the simple inspection image extraction unit 108, the detailed inspection image extraction unit 109, the prediction unit 110, the result summing unit 113, and the result notification unit 114 can be achieved, for example, by a CPU for executing processing according to program control.

In addition, the simple inspection learning image storage unit 101, the detailed inspection learning image storage unit 102, the inspection image storage unit 103, the simple inspection learning correct answer label storage unit 104, the detailed inspection learning correct answer label storage unit 105, the prediction model storage unit 107, the simple inspection result storage unit 111, and the detailed inspection result storage unit 112 can be achieved, for example, with a RAM (Random Access Memory).

In addition, each unit in the image inspection device 10 and the image inspection system 100 of each exemplary embodiment may be achieved with a hardware circuit. As an example, each of the first extraction unit 11, the determination unit 12, the second extraction unit 13, the simple inspection learning image storage unit 101, the detailed inspection learning image storage unit 102, the inspection image storage unit 103, the simple inspection learning correct answer label storage unit 104, the detailed inspection learning correct answer label storage unit 105, the learning unit 106, the prediction model storage unit 107, the simple inspection image extraction unit 108, the detailed inspection image extraction unit 109, the prediction unit 110, the simple inspection result storage unit 111, the detailed inspection result storage unit 112, the result summing unit 113, and the result notification unit 114 is achieved with an LSI (Large Scale Integration). In addition, they may be achieved with one LSI.

The defective product inspection device using learning type image recognition technology performs learning by using images taken of good products and images taken of defective products. In addition, the defective product inspection device performs inspection by using the images taken of the inspection target products.

However, there is a problem that the recognition accuracy of the defective product inspection device deteriorates if the size of the image in which the defective area is displayed is smaller than the size of the image taken of the inspection target product. For example, if the size of an image in which a defective area such as a scratch is displayed is 10×10 (px) with respect to an image having a size of 1000×1000 (px), since the image in which the defective area is displayed is small, the recognition accuracy deteriorates.

In order to solve the above problem of the deterioration of recognition accuracy, it is conceivable to divide the inspection target image into the size of the image in which the defective area is displayed to perform learning and inspection. However, in the learning type image recognition technology, the shape in itself of the recognition target (that is, defective area) is not stored, a plurality of images are superimposed, and weight learning is performed. Therefore, even if a part of the recognition target is detected from the divided inspection target image, it is difficult for a defective product inspection device using learning type image recognition technology to recognize the shape of the whole recognition target from the detected part.

In addition, the whole recognition target is not necessarily displayed in the divided inspection target image. Therefore, when the inspection target image is divided, the defective product inspection device is required to shift the recognition region little by little over the whole inspection target image. That is, since inspection is always performed a plurality of times, it is difficult to speed up inspection processing.

In an inspection device using non-learning type image recognition technology, the problem of an increase in time for the inspection processing described above does not occur. However, the fact that the targets of image recognition are finely classified to be stored in the inspection device is the conditions for use of the inspection device using non-learning type image recognition technology.

For example, when the recognition target is an irregular-shaped object such as a "scratch", accumulation itself of data required for image recognition of an irregular-shaped object is difficult. That is, there is a problem that an inspection device using non-learning type image recognition technology is hard to use for inspection of an irregular-shaped object.

In order to solve each of the above problems, it is conceivable to use an inspection device that combines learning type image recognition technology and non-learning type image recognition technology. However, there are problems such as the complication of device configuration and the costliness of using the inspection device.

As described above, image inspection using machine learning has a problem that processing takes time. In particular, product inspection in line production performed in factories and the like is required to be performed at high speed. This is because, since products flow one after another in the line production method, inspection processing is required to be executed according to the moving speed of the product. That is, when product inspection with an image inspection device is incorporated into line production and the like, inspection processing of the image inspection device is required to speed up.

PTL 3 describes an inspection device (image processing device) for using an image whose inspection processing is accelerated. The inspection device described in PTL 3 performs inspection processing at high speed by parallelizing processing.

However, for parallelization of processing, the inspection device described in PTL 3 is required to read a lot of image data. That is, there is a problem that the load on the inspection device is heavy and a buffer with large capacity is required for reading image data.

According to the present invention, inspection processing can be executed at high speed by using learning type image recognition technology.

While the invention has been particularly shown and described with reference to exemplary embodiments thereof, the invention is not limited to these embodiment. It will be understood by those of ordinary skill in the art that various changes in form and details may be made therein without departing from the spirit and scope of the present invention as defined by the claims.

The present invention is suitably applied when defective product inspection of goods produced in a line production method in factories is performed at high speed.

The invention claimed is:

1. An image inspection device comprising:
one or more processors configured to repeatedly execute processing for moving a first predetermined region on an inspection target image by a predetermined distance to extract a first determination image that is an image of the first predetermined region after movement until a predetermined first ratio of the inspection target image is included in a plurality of first determination images, determine a first possibility that an inspection object is included in the first determination image, repeatedly execute processing for moving a second predetermined region by a distance smaller than the predetermined distance on the image in the inspection target image to extract a second determination image while the image in the inspection target image including the first determination image included in the extracted second determination image is less than a predetermined second ratio, the second predetermined region including the first determination image, the second determination image being an image of the second predetermined region after movement, and determine a second possibility that the inspection object is included in the second determination image.

2. The image inspection device according to claim 1, wherein the one or more processors determines the first possibility or the second possibility that the inspection object is respectively included in the first determination image or the second determination image by using a prediction model generated by learning processing.

3. The image inspection device according to claim 2, wherein the one or more processors is further configured to generate a prediction model representing a relationship between an image on which the inspection object is displayed and information indicating that the image is a display image of the inspection object with learning processing.

4. The image inspection device according to claim 3, wherein the information indicating that the image is a display image of the inspection object includes information indicating a position in an image in which the inspection object is displayed, and the one or more processors uses a prediction model to determine each of first possibilities that the inspection object is included in a corresponding one of positions in a first determination image.

5. The image inspection device according to claim 4, wherein the one or more processors moves a predetermined second region on the basis of a position corresponding to the first possibility in a first determination image where a determined first possibility satisfies a predetermined condition.

6. The image inspection device according to claim 5, wherein the one or more processors determines the image in the inspection target image including the first determination image on which the second predetermined region is moved on the basis of each of the first possibilities that the inspection object is included in a corresponding one of the positions related to first determination images adjacent to the first determination image where the determined first possibility satisfies the predetermined condition.

7. An image inspection method comprising:

repeatedly executing processing for moving a first predetermined region on an inspection target image by a predetermined distance to extract a first determination image that is an image of the first predetermined region after movement until a predetermined first ratio of the inspection target image is included in a plurality of first determination images;

determining a first possibility that an inspection object is included in the first determination image;

repeatedly executing processing for moving a second predetermined region by a distance smaller than the predetermined distance on the image in the inspection target image to extract a second determination image while the image in the inspection target image including the first determination image included in the extracted second determination image is less than a predetermined second ratio, the second predetermined region including the first determination image, the second determination image being an image of the second predetermined region after movement; and determining a second possibility that the inspection object is included in the second determination image.

8. The image inspection method according to claim 7, wherein determining the first possibility or the second possibility that the inspection object is respectively included in the first determination image or the second determination image by using a prediction model generated by learning processing.

9. A non-transitory computer-readable recording medium recording an image inspection program for causing a computer to execute:

repeatedly executing processing for moving a first predetermined region on an inspection target image by a predetermined distance to extract a first determination image that is an image of the first predetermined region after movement until a predetermined first ratio of the inspection target image is included in a plurality of first determination images;

determining a first possibility that an inspection object is included in the first determination image;

repeatedly executing processing for moving a second predetermined region by a distance smaller than the predetermined distance on the image in the inspection target image to extract a second determination image while the image in the inspection target image including the first determination image included in the extracted second determination image is less than a predetermined second ratio, the second predetermined region including the first determination image, the second determination image being an image of the second predetermined region after movement; and determining a second possibility that the inspection object is included in the second determination image.

10. The recording medium according to claim 9, wherein the determining the first possibility or the second possibility that the inspection object is respectively included in the first determination image or the second determination image by using a prediction model generated by learning processing.

11. The image inspection device according to claim 2, wherein the one or more processors is further configured to move the second predetermined region according to the position of the inspection object indicated by a label corresponding to a score which is output by the prediction model.

* * * * *